United States Patent
Haldar et al.

(10) Patent No.: US 11,811,250 B2
(45) Date of Patent: Nov. 7, 2023

(54) REMOVABLE BATTERY PACK AND/OR ELECTRICAL CONSUMER WITH AN ELECTROMECHANICAL INTERFACE FOR SUPPLYING ENERGY

(71) Applicant: Robert Bosch GmbH, Stuttgart (DE)

(72) Inventors: Arindam Haldar, Ostfildern (DE); Axel Kuhnle, Freiberg (DE); Benjamin Grauer, Stuttgart (DE); Christian Wiedemann, Wiernsheim (DE); Jan Breitenbach, Stuttgart (DE); Marcin Rejman, Waiblingen (DE); Tobias Mangold, Murrhardt (DE); Tobias Overbeck, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 17/382,530

(22) Filed: Jul. 22, 2021

(65) Prior Publication Data
US 2022/0052542 A1  Feb. 17, 2022

(30) Foreign Application Priority Data

Aug. 14, 2020  (DE) ...................... 10 2020 210 377.1

(51) Int. Cl.
*H02J 7/00* (2006.01)
*G01N 25/72* (2006.01)
*H01R 13/66* (2006.01)

(52) U.S. Cl.
CPC .......... *H02J 7/00309* (2020.01); *G01N 25/72* (2013.01); *H01R 13/6683* (2013.01); *H02J 7/0042* (2013.01)

(58) Field of Classification Search
CPC ........................... H02J 7/0042; H02J 7/00309
See application file for complete search history.

(56) References Cited

U.S. PATENT DOCUMENTS 6,237,698 B1 * 5/2001 Carrier .................... H02P 7/288
                                                    173/171
2020/0251915 A1 * 8/2020 Singer ................ H01M 10/486

FOREIGN PATENT DOCUMENTS

| DE | 10 2008 000 704 A1 | 10/2008 |
|---|---|---|
| DE | 10 2016 225 730 A1 | 6/2018 |
| EP | 3 160 004 B1 | 4/2017 |
| WO | 2010/023246 A1 | 3/2010 |
| WO | 2019/062965 A1 | 4/2019 |

* cited by examiner

*Primary Examiner* — Robert Grant
(74) *Attorney, Agent, or Firm* — Maginot, Moore & Beck LLP

(57) ABSTRACT

An electrical consumer system includes an electrical consumer with a first mating interface and a first plurality of electrical contacts, and a removable battery pack including a second mating interface and a second plurality of electrical contacts, the second mating interface configured to removably mate with the first mating interface such that the second plurality of contacts contact the first plurality of contacts. At least one of the first and second mating interfaces includes a temperature sensor configured to detect at least one of a temperature of the at least one of the first and second mating interfaces, and a temperature of the first or second electrical contacts of the at least one of the first and second mating interfaces.

15 Claims, 4 Drawing Sheets

REMOVABLE BATTERY PACK AND/OR ELECTRICAL CONSUMER WITH AN ELECTROMECHANICAL INTERFACE FOR SUPPLYING ENERGY

This application claims priority under 35 U.S.C. § 119 to application no. DE 10 2020 210 377.1, filed on Aug. 14, 2020 in Germany, the disclosure of which is incorporated herein by reference in its entirety.

The present disclosure relates to a removable battery pack with a first electromechanical interface for supplying energy to an electrical consumer and/or an electrical consumer with a further electromechanical interface for supplying energy by way of a removable battery pack, wherein the electromechanical interfaces each have a plurality of electrical contacts which can be connected to the electrical contacts of the mating interfaces.

BACKGROUND

A multiplicity of electrical consumers is operated with battery packs which are removable by the operator without tools—referred to as removable battery packs hereinafter—and which are correspondingly discharged by the electrical consumer and can be recharged by means of a charging device. Removable battery packs of this type usually consist of a plurality of energy storage cells which are connected in series and/or in parallel, in order to achieve a required removable battery pack voltage or capacity. If the energy storage cells are designed as lithium-ion cells (Li-ion), for example, this particularly advantageously makes it possible to achieve a very high power density and energy density.

Monitoring the temperature by means of corresponding temperature sensors in order to protect the energy storage cells against damage as a result of excessive heating is known, in particular in removable battery packs. In addition, temperature sensors of this type can also be used for detecting the ambient temperature, in order to limit or to end or to interrupt the charging or discharging process in the case of the ambient temperatures being too low or too high. A removable battery pack for an electric hand tool is known from WO 2010/023246 A1, wherein the removable battery pack has an analog temperature sensor with a negative temperature coefficient, a temperature measuring contact which is accessible from the outside and a monitoring unit which monitors the removable battery pack for an error function. The monitoring unit of the removable battery pack is designed in such a way that it actively changes a voltage at the temperature interface in the event of an error function of the removable battery pack.

In certain applications, electrical consumers with high electrical powers must be operated, which can lead to very high discharge currents of over 200 A, in particular in the case of battery-operated devices. Since strong vibrations can also often occur in applications of this type, over time this can result in corrosion of the electrical energy supply contacts (fretting) at the electromechanical interfaces between the removable battery pack and electrical consumer. This contact corrosion is permanent and increasingly leads to high power loss, which results in a strong temperature increase at the contact points.

Based on the prior art, the object of the disclosure is to identify high temperatures at the electromechanical interfaces, in particular at the electrical contacts of the electromechanical interfaces, of a removable battery pack and/or of an electrical consumer, in order to be able to take appropriate measures at an early stage against damage to the electrical contacts.

SUMMARY

According to the disclosure, provision is made for the first and/or the second electromechanical interface to have a temperature sensor for detecting a temperature of the electromechanical interface and/or at least one of the electrical contacts, in particular during operation of the electrical consumer. This particularly advantageously enables temperature monitoring directly at the electromechanical interfaces in real time, in order to thus be able to respond to a high power loss as a result of contact corrosions of the electrical contacts generated by vibrations and avoid a thermal overload of the electromechanical interfaces. In addition, the disclosure makes it possible to protect further components and surrounding structural components of the electromechanical interfaces against thermal overload.

Within the context of the disclosure, power tools operated with a removable battery pack for machining workpieces by means of an electrically driven insertion tool are intended to be understood as electrical consumers, for example. In this case, the power tool can be formed as both an electric hand tool and also a stationary electric machine tool. In this context, typical power tools are hand drills or drill presses, screwdrivers, impact drills, drill hammers, planes, angle sanders, orbital sanders, polishing machines, circular saws, bench saws, chop saws and jigsaws or the like. However, gardening tools operated with a removable battery pack, such as lawnmowers, lawn trimmers, pruning saws or the like, as well as household appliances operated with a removable battery pack, such as vacuum cleaners, food processors etc., are also considered to be electrical consumers. The disclosure can also be applied to electrical consumers which are supplied with a plurality of removable battery packs at the same time.

The voltage of a removable battery pack is usually a multiple of the voltage of an individual energy storage cell and results from the (parallel or serial) interconnection of the individual energy storage cells. An energy storage cell is typically designed as a galvanic cell which has a structure in which a cell pole comes to rest at one end and a further cell pole at an opposite end. In particular, the energy storage cell has a positive cell pole at one end and a negative cell pole at an opposite end. The energy storage cells are preferably designed as lithium-based energy storage cells, for example Li-ion, Li—Po, Li-metal or the like. However, the disclosure can also be applied to removable battery packs with Ni—Cd, Ni-MH cells or other suitable types of cells. In the case of common Li-ion energy storage cells with a cell voltage of 3.6 V, there arises, by way of example, voltage classes of 3.6 V, 7.2 V, 10.8 V, 14.4 V, 18 V, 36 V, etc. An energy storage cell is preferably designed as an at least substantially cylindrical round cell, wherein the cell poles are arranged at ends of the cylindrical shape. However, the disclosure is not dependent on the type and design of the energy storage cells used, but rather it can be applied to any removable battery packs and energy storage cells, for example in addition to round cells, also pouch cells, or the like.

In a development of the disclosure, provision is made for the temperature sensor to detect the temperature of an electrical contact which is designed as an energy supply contact. The energy supply contacts of the electromechanical interfaces typically carry much higher currents than the electrical contacts designed as a signal contact or data contact, for example. This means that, depending on the requirements and use of the electrical consumer, discharge currents of over 200 A may occur which, in conjunction with strong and persistent vibrations during operation of the electrical consumer, are responsible for very high temperatures at the electrical contacts as a consequence of the high power loss resulting from the contact corrosions which have developed.

The temperature sensor of the electromechanical interface is particularly advantageously directly connected to an electrically conductive part of the electrical contact, in particular to a contact tab or tulip contact or a contact pin of the electrical contact, a cable lug and/or a fastening element for the cable lug, in a thermal manner. This makes it possible to detect the temperature in a particularly quick and accurate manner as well as to react quickly to correspondingly excessive temperature values if applicable. In this case, the temperature sensor can be designed as an NTC resistor, a Type K thermocouple or a PT100 element.

In order to optionally allow the operator to intervene quickly to prevent defects, provision is made for information regarding an excessive temperature value, in particular regarding a temperature value which exceeds a temperature limit value, is signaled by an indicator and/or is transmitted via a communication interface to an external data processing device. In particular, an external data processing device is intended to be understood to mean a smartphone, tablet, PC, a cloud or the like.

The state of a surface parameter of the contact which is thermally connected to the temperature sensor and/or a degradation state of the electromechanical interface can particularly advantageously be determined depending on the detected temperature values. In this case, the surface parameter and/or the degradation state can be determined by means of the level, duration and/or accumulation of the detected temperature values, in particular the excessive temperature values, for example. This enables a preventative service note as a "comfort function", in order to prevent an unexpected functional failure. Moreover, this also permits advance planning of possible upcoming maintenance work on the electrical consumer and/or the removable battery pack.

In one further configuration of the disclosure, the removable battery pack has a monitoring unit for evaluating the detected temperature, wherein in the event that a temperature limit value is exceeded by the detected temperature, the monitoring unit sends information regarding the exceedance to the indicator, a communication interface and/or a contact, designed as a signal contact or data contact, of the electromechanical interface. This makes it possible to avoid, among other things, an already damaged removable battery pack from causing damage to the electromechanical interfaces of the electrical consumer it supplies.

Furthermore, provision is made for the electrical consumer to have a monitoring unit for evaluating the detected temperature, wherein in the event that a temperature limit value is exceeded by the detected temperature or upon receiving information sent by the removable battery pack regarding a detected, excessive temperature, the monitoring unit reduces or interrupts the discharge current of the removable battery pack. This makes it possible to avoid further damage to the electromechanical interfaces of the electrical consumer and/or of the removable battery pack. In addition, this also makes it possible to avoid fires at the discharge partners in a preventative manner.

BRIEF DESCRIPTION OF THE DRAWINGS

The disclosure is explained hereinafter by way of example using FIGS. 1 to 4, wherein the same reference numbers denote the same components with the same mode of operation in the figures.

In the drawings

DETAILED DESCRIPTION

Figure 1:
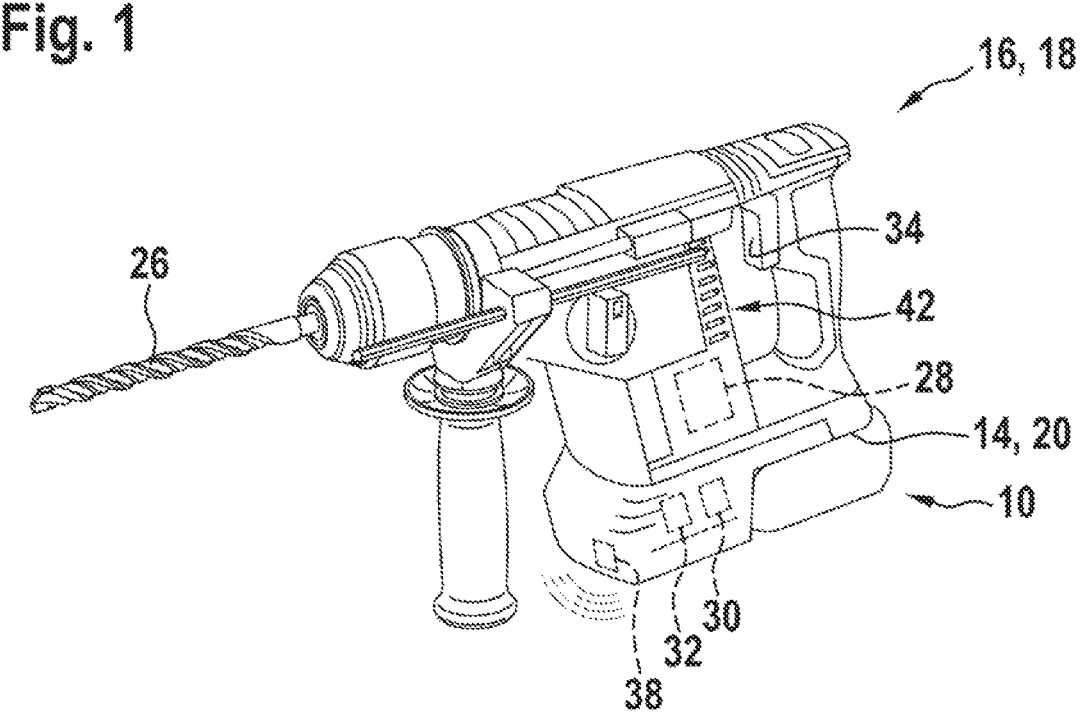
FIG. 1: shows a system comprising at least one removable battery pack and at least one electrical consumer which can be connected to the removable battery pack in the form of a drill hammer for discharging the removable battery pack in a schematic representation.
Figure 1:
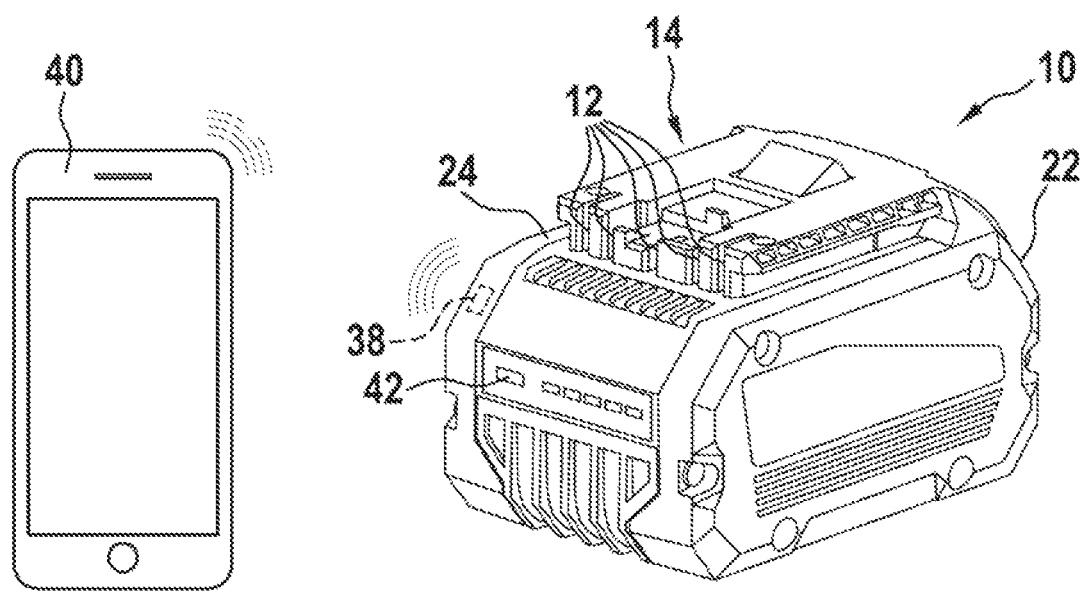

FIG. 1 shows a system comprising a removable battery pack 10 with a first electromechanical interface 14, which has a plurality of electrical contacts 12, and an electrical consumer 18 which is designed as a drill hammer 16, with a further electromechanical interface 20 which has a plurality of electrical contacts 12. Without limiting the disclosure, the system can comprise different electrical consumers 18 which can be operated with removable battery packs 10 and are designed as power tools, gardening tools or household appliances. The number of removable battery packs 10 within the system can also be changed. The system can therefore indeed also comprise a plurality of removable battery packs 10.

It should be noted that the overall configuration of the electromechanical interfaces 14, 20 of the removable battery packs 10 and the electrical consumers 18 which can be connected thereto as well as the associated receptacles for force-fitting and/or form-fitting releasable connection are not intended to be the subject matter of this disclosure. A person skilled in the art shall select a suitable embodiment for the interfaces 14, 20 depending on the power class or voltage class of the electrical consumer 18 and/or of the removable battery pack 10. The embodiments shown in the drawings are therefore to be understood as merely exemplary. As a result, interfaces 14, 20 with more electrical contacts 12 than represented can in particular also be used.

The removable battery pack 10 is essentially a conventional removable battery pack 10 with a housing 22 which has at a first side wall or its upper side 24 the first electromechanical interface 14 for releasable connection to the electromechanical interface 20 of the drill hammer 16. In this case, the removable battery pack 10 is discharged during operation of the drill hammer 16. In connection with a charging device which is not shown, the electromechanical interface 14 is also used to charge the removable battery pack 10. The precise configuration of the first and the further electromechanical interface 14, 20 depends on different factors, such as the voltage class of the removable battery pack 10 or of the electrical consumer 18 and various manufacturer's specifications, for example. Three or more electrical contacts 12 for energy and/or data transmission between the removable battery pack 10 and the electrical consumer 16 can therefore be provided, for example. A mechanical coding is also conceivable, so that the removable battery pack 10 can only be operated on certain electrical consumers 18. Since the mechanical configuration of the first electromechanical interface 14 of the removable battery pack 10 and the further electromechanical interface 20 of the electrical consumer 18 is irrelevant to the disclosure, it shall not be discussed in any further detail. Both a person skilled in the art and an operator of the removable battery pack 10 and of the electrical consumer 18 will make a suitable selection in this regard.

The drill hammer 16 possesses a striking mechanism, which is not shown in more detail, for driving an insertion tool 26. The striking mechanism is driven via an electric motor 28 which is merely indicated and which is supplied with energy by power electronics 30. The power electronics 30 is controlled via a monitoring unit 32 which is integrated in the drill hammer 16 for regulating or controlling the electric motor 28, for example depending on a main switch 34 which can be actuated by the operator. However, an additional, detailed description of the electrical consumer 18 which is designed as a drill hammer 16 should be dispensed with, since it is not relevant for the disclosure and the drill hammer 16 should be understood in a merely exemplary manner for different electrical consumers 18 which can be supplied by the removable battery pack 10.

The removable battery pack 10 possesses a mechanical locking device 36 for locking the form-fitting and/or force-fitting releasable connection of the first electromechanical interface 14 of the removable battery pack 10 to the corresponding mating interface 20 (not shown in detail) of the drill hammer 16. In this case, the locking device 36 is designed as a spring-loaded trigger which is not shown and which is operatively connected to a locking member of the removable battery pack 10. Owing to the suspension of the trigger and/or the locking member, the locking device 36 automatically snaps in when the removable battery pack 10 is inserted into the mating interface 20 of the drill hammer 16. If an operator pushes the trigger in the direction of insertion, the lock is released and the operator can remove or slide the removable battery pack 10 out of the drill hammer 16 against the direction of insertion.

As already mentioned at the outset, the battery voltage of the removable battery pack 10 usually results from a multiple of the individual voltages of the energy storage cells (not shown) depending on their (parallel or serial) interconnection. The energy storage cells are preferably designed as lithium-based battery cells, for example Li-ion, Li—Po, Li-metal or the like. However, the disclosure can also be applied to removable battery packs with Ni—Cd, Ni-MH cells or other suitable types of cells.

It is possible for the operator to transmit charging and/or discharging parameters or identified error conditions of the removable battery pack 10 and/or of the drill hammer 16 to an external data processing device 40, such as a smartphone, tablet, PC, a cloud or the like, for example, via a communication interface 38, preferably designed as a radio interface (e.g. Bluetooth, WLAN, NFC, Zigbee, LoRa, GSM, UMTS or the like), of the removable battery pack 10 and/or of the drill hammer 16. The communication interface 38 can alternatively or additionally also be designed to be wired (e.g. USB, Lightning, RS232 or the like).

The drill hammer 16 and/or the removable battery pack 10 each possess an indicator 42 in the form of LEDs, a display and/or an acoustic signal generator for signaling information of various operating states and/or operating parameters. Additionally or alternatively, the indicator 42 can also be designed as a haptic signal generator, for example in the form of a vibration motor. In the case of an electrical consumer 18 driven by an electric motor, such as the drill hammer 16, it is also conceivable for the electric motor 28 to be used as a haptic and/or acoustic signal generator.

Figure 2:
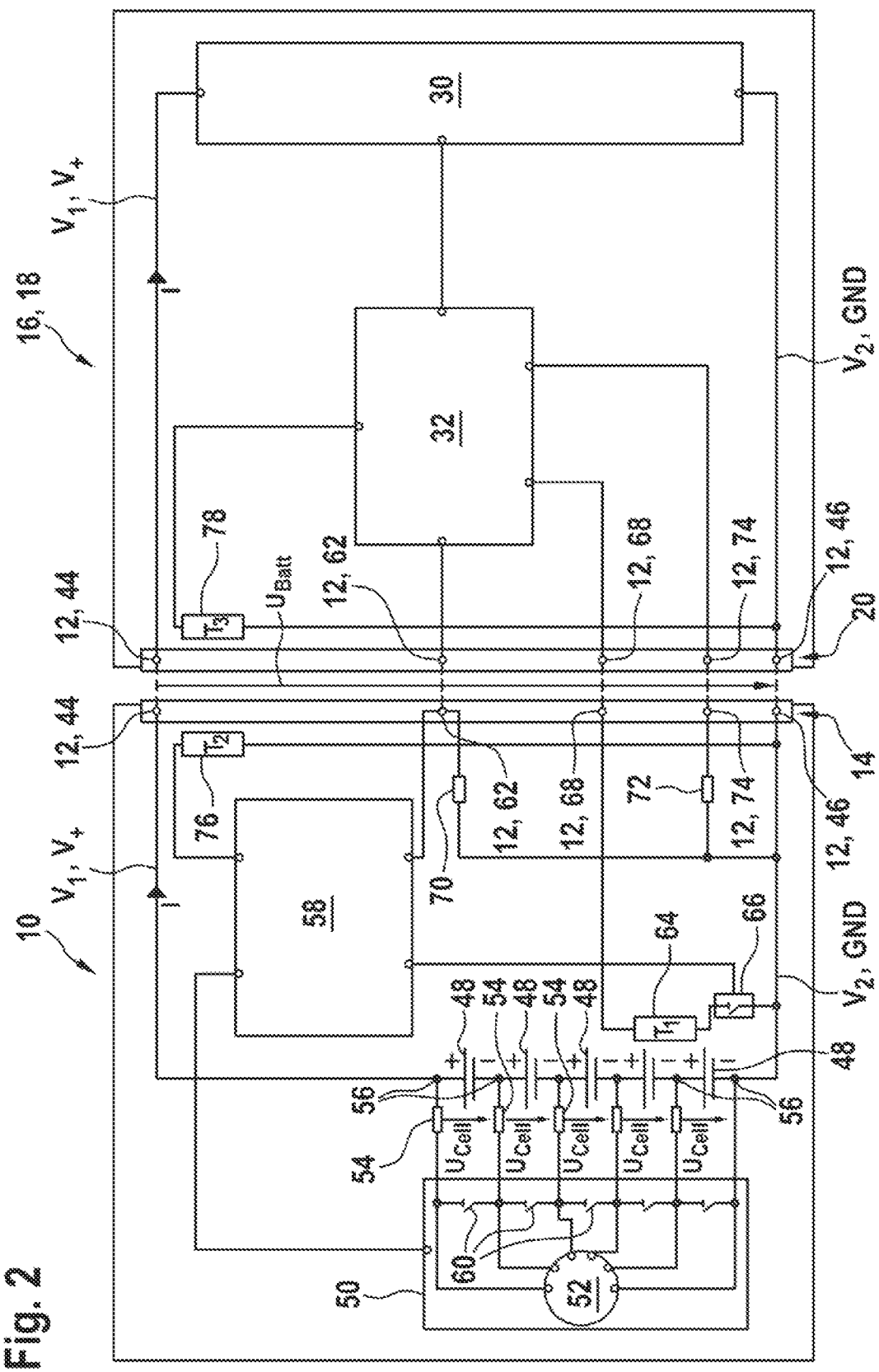
FIG. 2: shows the system from FIG. 1 as a block diagram with a removable battery pack and an electrical consumer which is designed as a drill hammer.

FIG. 2 represents the system from FIG. 1 as a block diagram with the removable battery pack 10 on the left side and the electrical consumer 18 which is designed as a drill hammer 16 on the right side. The terms drill hammer and electrical consumer are to be understood an synonyms hereinafter, since they are equivalent for the disclosure. The removable battery pack 10 and drill hammer 16 have the mutually corresponding electromechanical interfaces 14 and 20 with a plurality of electrical contacts 12, wherein in each case a first one of the electrical contacts 12 of the interfaces 14, 20 is used as an energy supply contact 44 which can be supplied with a first reference potential $V_1$, preferably a supply potential $V_+$, and in each case a second one of the electrical contacts 12 of the interfaces 14, 20 is used as an energy supply contact 46 which can be supplied with a second reference potential $V_2$, preferably a ground potential GND. Via the first and the second energy supply contact 44, 46, the removable battery pack 10, on the one hand, can be discharged and, on the other hand, can be charged via a charging device which is not shown. The term "can be supplied" is intended to mean that the potentials $V_+$ and GND, in particular in the case of an electrical consumer 18, are not permanently applied to the energy supply contacts 44, 46, but rather only after connecting the electromechanical interfaces 14, 20. The same applies to a discharged removable battery pack 10 after connecting to a charging device.

The removable battery pack 10 has a plurality of energy storage cells 48 which are in fact represented in FIG. 2 as a series connection but can alternatively or additionally also be operated in a parallel connection, wherein the series connection defines the voltage $U_{Batt}$ of the removable battery pack 10 dropping across the energy supply contacts 44, 46, while a parallel connection of individual energy storage cells 48 primarily increases the capacity of the removable battery pack 10. As already mentioned, individual cell clusters consisting of energy storage cells 48 connected in parallel can also be connected in series in order to achieve a specific voltage $U_{Batt}$ of the removable battery pack with simultaneously increased capacity. In the case of standard Li-ion energy storage cells 48 with a cell voltage $U_{Cell}$ of 3.6 V in each case, a removable battery pack voltage $U_{Batt}=V_1-V_2$ of 5·3.6 V=18 V drops across the energy supply contacts 44, 46 in the present exemplary embodiment. Depending on the number of energy storage cells 48 connected in parallel in a cell cluster, the capacity of standard removable battery packs 10 can be up to 12 Ah or more. However, the disclosure is not dependent on the type, design, voltage, power delivery capability, etc. of the energy storage cells 48 used, but rather it can be applied to any removable battery packs 10 and energy storage cells 48.

An SCM pre-amplifier 50 (single cell monitoring) is provided for monitoring the individual series connected energy storage cells 48 or cell clusters of the removable battery pack 10. The SCM pre-amplifier 50 has a multiplexer measuring device 52 which can be connected via filter resistors 54 with high impedance to corresponding taps 56 of the poles of the energy storage cells 48 or cell clusters. In order to detect the individual cell voltages $U_{Cell}$, the multiplexer measuring device 50 switches sequentially between the individual taps 56, for example via integrated transistors which are not shown in more detail, in such a way that in each case it is connected to a positive and a negative terminal of the energy storage cell 48 to be measured or the cell cluster to be measured. The term energy storage cell is intended to also comprise the cell cluster hereinafter, since they only have an influence on the capacity of the removable battery pack 10 but are equivalent for detecting the cell voltages $U_{Cell}$. In particular in the event of an error, the filter resistors 54 which are in particular configured to have high impedance can prevent a dangerous heating of the measurement inputs of the multiplexer measuring device 50.

Switching the multiplexer measuring device 50 takes place via a monitoring unit 58 integrated in the removable battery pack 10. This can additionally close or open switch elements 60, connected in parallel to the energy storage cells 48, of the SCM pre-amplifier 50, in order to thus bring about a so called balancing of the energy storage cells 48 for achieving uniform charge or discharge states of the individual energy storage cells 48. It is also conceivable for the SCM pre-amplifier 50 to pass on the measured cell voltages $U_{Cell}$ directly to the monitoring unit 58, so that the actual measurement of the cell voltages $U_{Cell}$ is carried out directly by the first monitoring unit 58, for example via corresponding analog-to-digital converters (ADC).

The monitoring unit 58 can be designed as an integrated circuit in the form of a microprocessor, ASIC, DSP, or the like. However, it is likewise also conceivable for the monitoring unit 58 to consist of a plurality of microprocessors or at least partially of discrete components with corresponding transistor logic. In addition, the monitoring unit 58 can have a store for storing operating parameters of the removable battery pack 10, such as the voltage $U_{Batt}$, the cell voltages $U_{Cell}$, temperature values T, for example, of a charge or discharge current I or the like.

The monitoring unit 32 of the electrical consumer 16 can also be designed corresponding to the monitoring unit 58 of the removable battery pack 10. The monitoring units 32 or 58 can exchange information preferably digitally via a third electrical contact 12, designed as a signal contact or data contact 62, of the two electromechanical interfaces 14, 20. The monitoring unit 32 of the drill hammer 16 controls the power electronics 30 which is connected to the first and the second energy supply contact 44, 46 of the further interface 20 and via which, in particular as a function of the main switch 34, a speed and/or a torque of the electric motor 28 which is not represented in more detail can be changed. Of course, the monitoring unit 32 can also regulate or control the power electronics 30 depending on system internal parameters, such as the voltage $U_{Batt}$, the cell voltages $U_{Cell}$, the temperature values T, of a charge or discharge current I or the like.

By means of a first temperature sensor 64 which is arranged in the removable battery pack 10 and which is preferably designed as an NTC and is in close thermal contact with at least one of the energy storage cells 48, a temperature $T_1$ of the removable battery pack 10 or the energy storage cells 46 can be measured and evaluated by the monitoring unit 32 of the drill hammer 16. For this purpose, the first temperature sensor 64, on one side, is connected via a switch element 66 integrated in the removable battery pack 10, for example a bipolar transistor or MOSFET, to the second reference potential $V_2$ which is applied to the second energy supply contact 46, in particular to the ground potential GND, and, on the other side, is connected to an electrical contact 12, designed as a signal contact or data contact 68, of the first interface 14 of the removable battery pack 10. Correspondingly, a signal contact or data contact 68 is provided in the further interface 24 of the drill hammer 16 which is connected to the monitoring unit 32. By opening the switch element 66, the monitoring unit 58 of the removable battery pack 10 can signal an electrical error condition in the removable battery pack 10 to the monitoring unit 32 of the drill hammer 16 or a corresponding monitoring unit of a charging device, so that the drill hammer 16 or the charging device disconnects or interrupts the discharging or charging process.

In order for a charging device to be able to identify the removable battery pack 10 and, if applicable, to enable it to charge, the removable battery pack 10 has a first coding resistor 70 which, on one side, is connected to the second reference potential $V_2$ which is applied to the second energy supply contact 46, in particular to the ground potential GND, and, on the other side, is connected to the third electrical contact 12, designed as a signal contact or data contact 62, of the first interface 14 of the removable battery pack 10. In addition to the first coding resistor 70, a second coding resistor 72 is also provided in the removable battery pack 10, which second coding resistor, corresponding to the first coding resistor 70, is connected to the second reference potential $V_2$ and a further electrical contact 12, designed as a signal contact or data contact 74, of the first interface 14 of the removable battery pack 10. The drill hammer 16 can enable or block the discharging process of the removable battery pack 10 via the second coding resistor 76. For this purpose, the monitoring unit 32 of the drill hammer 16 retrieves the resistance value of the second coding resistor 72 via the signal contact or data contact 74 of the further interface 20 and compares it to a stored value. If the values do not match, the discharging process of the removable battery pack 10 is disconnected or not permitted, so that the drill hammer 16 cannot be put into operation. If they do match, an operator can put the drill hammer 16 into operation via the main switch 34. This particularly advantageously permits operation of removable battery packs 10 of different power classes with the same electromechanical interfaces 14 or 20 on different electrical consumers 18.

The removable battery pack 10 has at least one further temperature sensor 76 which, on one side, is connected to the monitoring unit 58 and, on the other side, is connected to the second supply potential $V_2$, in particular to the ground potential GND. The further temperature sensor 76 is used for thermally monitoring the first electromechanical interface 14 or the electrical contacts 12 thereof, in particular the electrical contacts 12 which are designed as energy supply contacts 44, 46. For this purpose, the temperature $T_2$ measured by the further temperature sensor 76 is evaluated by the monitoring unit 58 and, if applicable, the charging or discharging process is influenced in addition to the temperature $T_1$ measured by the first temperature sensor 64. In order to influence the charging or discharging process, the monitoring unit 58 of the removable battery pack 10 can open the switch element 66 for the first temperature sensor 64, in order to signal an excessing temperature $T_1$ or $T_2$ to the monitoring unit 32 of the drill hammer 16 or a corresponding monitoring unit of a charging device, so that the drill hammer 16 or the charging device for its part disconnects or interrupts the charging or discharging process.

Alternatively or additionally, the drill hammer 16 can also have a temperature sensor 78 for thermally monitoring the further electromechanical interface 20 or the electrical contacts 12 thereof. For evaluating the temperature $T_3$ measured by the temperature sensor 78, said sensor is connected to the monitoring unit 32 of the drill hammer 12 in an analogous manner to the removable battery pack 10. Measuring the temperatures $T_2$ or $T_3$ in the region of the electromechanical interfaces 14, 20 makes it possible, with appropriate selection of the permissible temperature limit values $T_{max}$, to prevent a thermal overload of the structural elements which surround the electromechanical interfaces 14, 20, so that a thermal deformation of mechanical guide elements and locking elements can be avoided, for example.

An exceedance of the respective temperature limit value $T_{max}$ by the measured temperatures $T_1$, $T_2$ and/or $T_3$ can be indicated to the operator via the indicator 42 of the drill hammer 16 and/or of the removable battery pack 10. In this case, information regarding a "too hot interface" or the like can be signaled to the operator, in particular if the temperature limit value $T_{max}$ is exceeded by 80° C., for example, by the measured interface temperatures $T_2$ or $T_3$. It is also conceivable that in the case of the monitoring units 32, 58 of the electrical consumer 18 or of the removable battery pack 10 correspondingly evaluating the interface temperature values $T_2$ or $T_3$ with respect to their level, duration and/or accumulation, a conclusion is drawn regarding the degradation state of the electromechanical interfaces 14, 20 or the electrical contacts 12, so that an appropriate service recommendation for replacing the electromechanical interface 14, 20 or the contact holder 80 can be communicated to the operator via the indicator 42. However, the temperature values $T_2$ or $T_3$ can also be transmitted to the external data processing device 40 via the communication interface 38, which data processing device for its part then carries out the evaluation and makes a service recommendation.

Figure 3A:
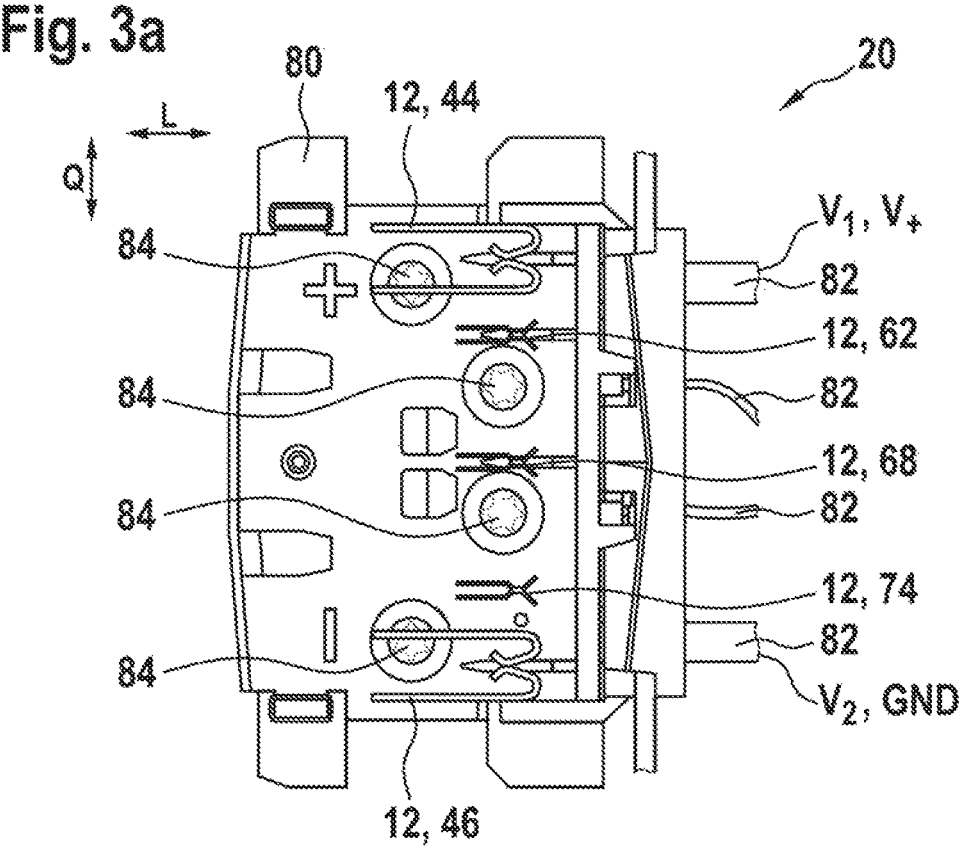
FIG. 3a: shows a detail view of the further electromechanical interface of the drill hammer in a front view.
Figure 3B:
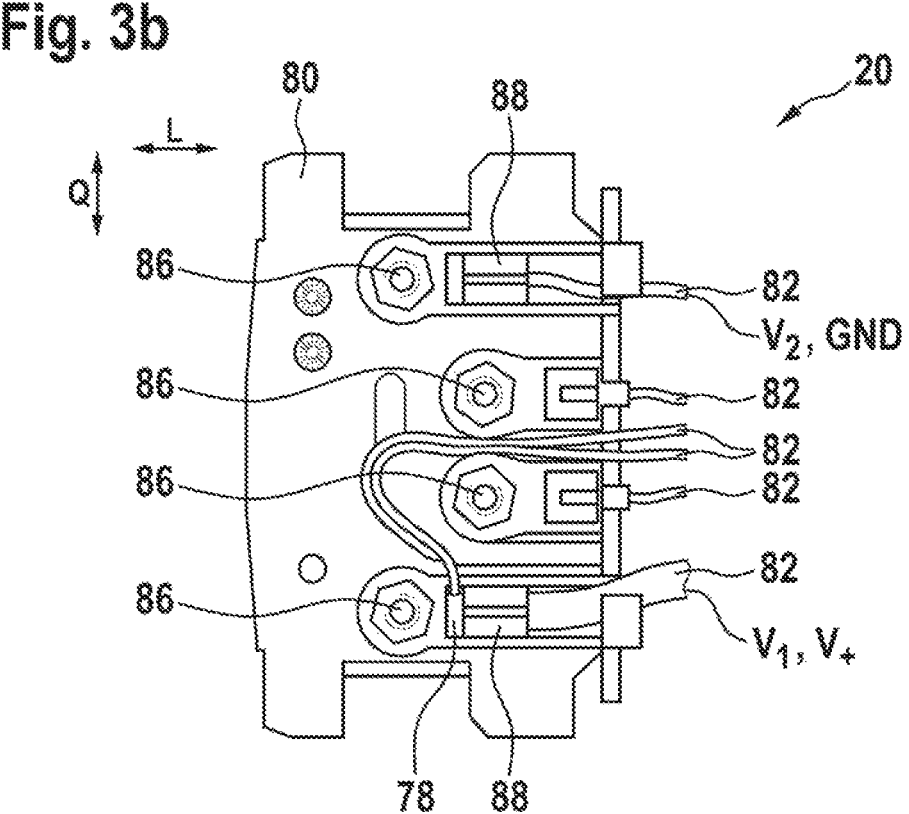
FIG. 3b: shows a detail view of the further electromechanical interface of the drill hammer in a rear view.

FIGS. 3a and 3b represent detail views of the further electromechanical interface 20 of the electrical consumer 18 which is designed as a drill hammer 16 in a front view of the electrical contacts 12 (FIG. 3a) and in a rear view of the contact holder 80 for the electrical contacts 12 (FIG. 3b). Analogously to FIG. 2, the electromechanical interface 20 comprises the first energy supply contact 44, which can be supplied with the first reference potential $V_1$ or the supply potential $V_+$, and the second energy supply contact 46, which can be supplied with the second reference potential $V_2$ or the ground potential GND, as well as the signal contacts or data contacts 62, 68 and 74. Cables 82 which are in each case adapted to the electrical requirements run from the electrical contacts 12 to the associated components, in particular to the monitoring unit 32 and to the power electronics 30, of the electrical consumer 18. The electrical contacts 12 are designed as spring-loaded contact tabs or tulip contacts which interact with the corresponding electrical contacts 12, designed as contact pins, of the mating interface 14 of the removable battery pack 10. The electrical connection between the cables 82 and the electrical contacts 12 takes place via screw elements 84 which, according to FIG. 3b, are screwed into threaded sleeves 86 on the back of the contact holder 80 in each case. However, other fastening elements such as rivet connections, for example, are also conceivable. The cables 82 are fixed between the screw elements 84 and the threaded sleeves 86 by means of cable lugs 88 connected in a form-fitting or materially bonded manner (cf. FIG. 4). In this case, a crimp connection may be considered as a form fit, for example, while the material connection can be realized by way of a solder connection.

The electromechanical interface 20 or the contact holder 80 is preferably mounted in a spring-loaded or movable manner in a longitudinal direction L and/or transverse direction Q relative to a receptacle, not shown in more detail, of the electrical consumer 18, in order to allow relative movements between the removable battery pack 10 and the electrical consumer 18 as a result of vibrations which occur during operation and to reduce the mechanical stress of the electromechanical interfaces 14, 20. Nevertheless, depending on the application and stress of the electrical consumer 18, the electromechanical interfaces 14, 20 are exposed to increased currents as well as strong mechanical loads (periodic and non-periodic shocks and vibrations). In particular, the latter can lead to changes in the electrical connection and contact transitional situation as a result of the not infinitely rigid connection of all contact components of the electromechanical interfaces 14, 20, which changes, on their own and above all in combination with an increased discharge current, result in contact corrosion phenomena (fretting). As a consequence, the surfaces of the electrical contacts 12 may be permanently damaged. In conjunction with an increased current level, greatly increased temperatures may occur in the immediate contact zones of the electrical contacts 12 caused by the electrical power loss in the transition, which temperatures negatively affect the surrounding parts and components. With increasing contact corrosion,—this refers to lasting, permanent damage to the surfaces of the electrical contacts 12—excessive heating in corresponding discharge currents already sets in after increasingly shorter device operating times. In order to be able to respond appropriately to this heating, provision is made for the electromechanical interface 20 to have the temperature sensor 78 for detecting the temperature $T_3$. In the example shown, the temperature sensor 78 is directly connected to the cable lug 88 of the first energy supply contact 44 in a thermal manner. However, it is also conceivable to provide the temperature sensor 78 at the second energy supply contact 46 or in its thermally well conductive environment. It may also possibly be useful to thermally couple the temperature sensor 78 or further temperature sensors to one or a plurality of the signal contacts or data contacts 62, 68, 74. NTC resistors, Type K thermocouples or PT100 elements are particularly preferably considered as temperature sensors 78.

Figure 4:
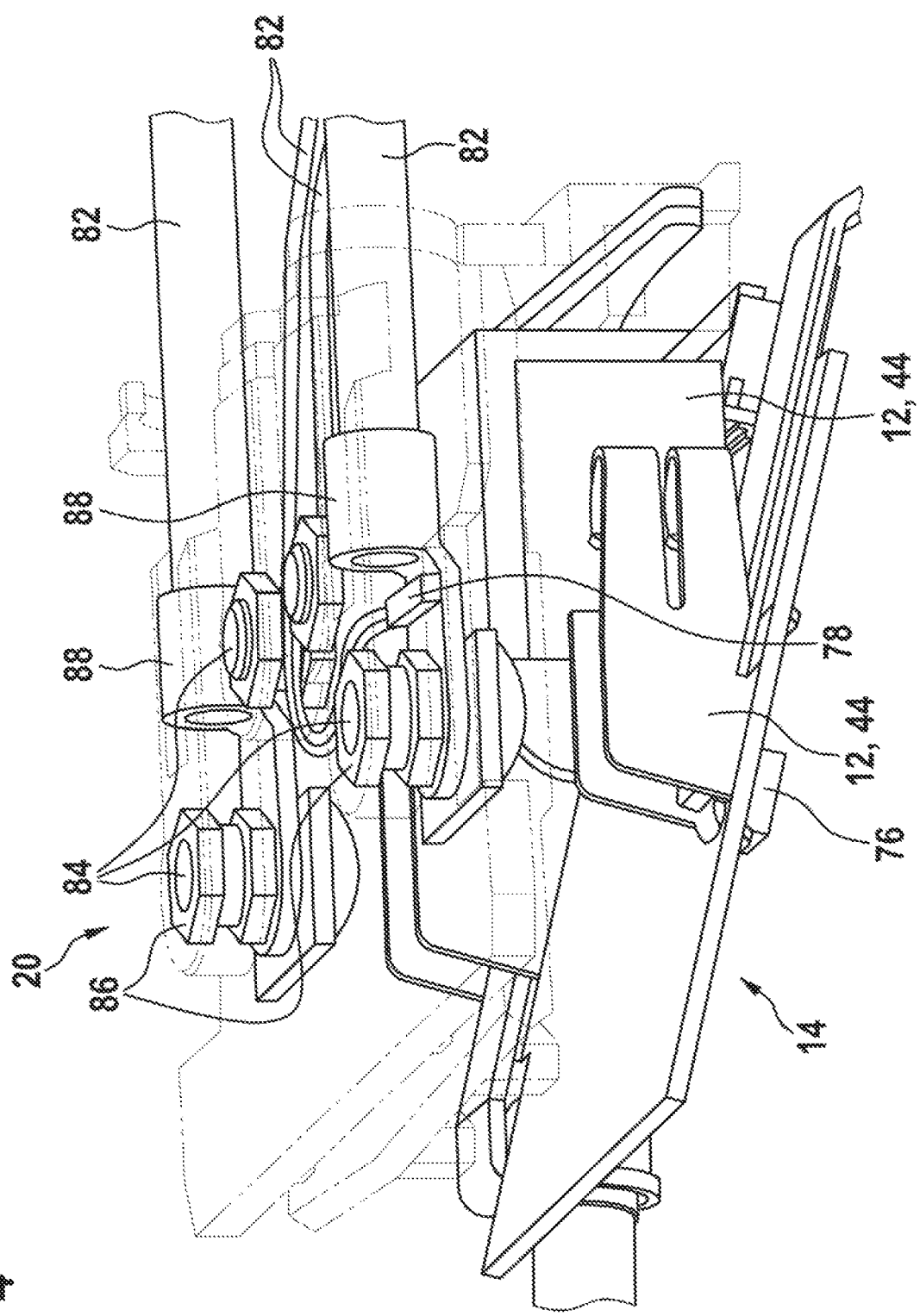
FIG. 4: shows a perspective view of the first and the further electromechanical interface of the removable battery pack or of the electrical consumer in the connected state.

FIG. 4 shows a perspective view of the first and the further electromechanical interface 14, 20 of the removable battery pack 10 or of the electrical consumer 18 in a connected state. Analogously to FIG. 3b, the temperature sensor 78 of the first electromechanical interface 20 of the electrical consumer 18 is directly connected to the cable lug 88 of the first energy supply contact 44 in a thermal manner. However, it is also conceivable to connect the temperature sensor 78 to a different electrically conductive part of the contact 12, in particular to the contact tab or tulip contact of the contact 12, the screw element 84 or the threaded sleeve 86 in a thermal manner. Installation is also possible in a thermally well conductive environment of the contact 12.

Alternatively or additionally, the first electromechanical interface 14 of the removable battery pack 10 has the temperature sensor 76 for detecting the temperature $T_2$. In the example shown, the temperature sensor 76 is directly connected to the contact tab of the first energy supply contact 44 in a thermal manner. However, analogous to the further electromechanical interface 20 of the electrical consumer 18, other installation locations are also conceivable for the temperature sensor 76 in the immediate environment of the current path, in particular the electrically conductive parts.

In conclusion, it should also be noted that the exemplary embodiments shown are neither limited to FIGS. 1 to 4, nor to the configurations of the electromechanical interfaces 14, 20 shown therein, including the number of their electrical contacts 12 and fastening elements 84, 86, 88.

What is claimed is:

1. An electrical consumer system comprising:
   an electrical consumer with a first mating interface and a first plurality of electrical contacts;
   a removable battery pack including a second mating interface and a second plurality of electrical contacts, the second mating interface configured to removably mate with the first mating interface such that the second plurality of contacts contact the first plurality of contacts, wherein
   at least one of the first and second mating interfaces includes a temperature sensor configured to detect at least one of a temperature of the at least one of the first and second mating interfaces, and a temperature of the first or second electrical contacts of the at least one of the first and second mating interfaces.

2. The electrical consumer system according to claim 1, wherein:
   the temperature sensor is configured to detect the temperature of a contact of the first or second electrical contacts that is configured as an energy supply contact.

3. The electrical consumer system according to claim 1, wherein:
   the temperature sensor is directly connected to an electrically conductive part of a contact of the first or second electrical contacts in a thermal manner.

4. The electrical consumer system according to claim 3, wherein:
   the temperature sensor is directly connected to one of a contact tab, a tulip contact, and a contact pin of the contact in the thermal manner.

5. The electrical consumer system according to claim 3, wherein:
   the contact includes at least one of a cable lug and a fastening element for the cable lug; and
   the temperature sensor is directly connected to the at least one of the cable lug and the fastening element for the cable lug.

6. The electrical consumer system according to claim 5, wherein:
   the temperature sensor is directly connected to the fastening element for the cable lug; and
   the fastening element is one of a screw element and a threaded sleeve.

7. The electrical consumer system according to claim 1, wherein the temperature sensor is configured as one of an NTC resistor, a Type K thermocouple, and a PT100 element.

8. The electrical consumer system according to claim 1, further comprising:
   an indicator configured to signal in response to information regarding a temperature value sensed by the temperature sensor which exceeds a temperature limit value.

9. The electrical consumer system according to claim 1, further comprising:
   a communication interface configured to transmit to an external data processing device information regarding a temperature value sensed by the temperature sensor which exceeds a temperature limit value.

10. The electrical consumer system according to claim 1, further comprising:
    an indicator configured to signal in response to information regarding a temperature value sensed by the temperature sensor which exceeds a temperature limit value; and
    a communication interface configured to transmit to an external data processing device the information regarding the temperature value sensed by the temperature sensor which exceeds the temperature limit value.

11. The electrical consumer system according to claim 3, further comprising:
    a monitoring unit configured to determine at least one of a state of a surface parameter of the contact which is thermally connected to the temperature sensor, and a degradation state of the at least one of the first and second mating interfaces using the detected temperature.

12. The electrical consumer system according to claim 11, wherein the monitoring unit is configured to determine the at least one of the state of a surface parameter and the degradation state of the at least one of the first and second mating interfaces using at least one of a level, a duration, and an accumulation of the detected temperature.

13. The electrical consumer system according to claim 1, wherein the removable battery pack further comprises:
    a monitoring unit configured to
        evaluate the detected temperature, and
        send information regarding an exceedance of a temperature limit value by the detected temperature to at least one of an indicator, a communication interface, and a contact configured as one of a signal contact and data contact of the electromechanical interface.

14. The electrical consumer system according to claim 1, wherein the electrical consumer further comprises:
    a monitoring unit configured to at least one of
        1) Evaluate the detected temperature and reduce or interrupt a discharge current of the removable battery pack in response to an exceedance of a temperature limit value by the detected temperature, and
        2) Reduce or interrupt the discharge current of the removable battery pack in response to temperature information received from the removable battery pack.

15. The electrical consumer system according to claim 1, wherein the temperature sensor is configured to detect a temperature value.

* * * * *